US006737170B2

(12) United States Patent
Fitch et al.

(10) Patent No.: US 6,737,170 B2
(45) Date of Patent: *May 18, 2004

(54) COATED FILM WITH EXCEPTIONAL EMBOSSING CHARACTERISTICS AND METHOD FOR PRODUCING IT

(75) Inventors: John Fitch, Warwick, RI (US); Jan Moritz, Bristol, RI (US); Steven J. Sargeant, Kingston, RI (US); Yuji Shimizu, Saunderstown, RI (US); Yasuo Nishigaki, Saunderstown, RI (US)

(73) Assignee: Toray Plastics (America), Inc., RI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/087,689

(22) Filed: Mar. 1, 2002

(65) Prior Publication Data

US 2003/0077467 A1 Apr. 24, 2003

Related U.S. Application Data

(60) Provisional application No. 60/348,422, filed on Oct. 24, 2001, and provisional application No. 60/317,765, filed on Sep. 6, 2001.

(51) Int. Cl.⁷ .................. B32B 27/08; B32B 27/18; B32B 27/30; B32B 27/36; B32B 31/14
(52) U.S. Cl. ............... 428/480; 428/156; 428/167; 428/172; 428/483; 428/910; 428/213; 428/215; 428/216; 428/332; 428/337; 428/339; 427/299; 427/322; 427/331; 427/384; 427/385.5; 427/393.5; 427/355; 427/359; 427/369; 427/370; 427/371; 264/288.4; 264/289.3; 264/290.2
(58) Field of Search ................ 428/156, 167, 428/172, 480, 483, 916, 212, 213, 214, 215, 216, 332, 337, 339; 927/299, 322, 331, 384, 385.5, 393.5; 264/288.4, 289.3, 290.2; 427/355, 359, 369, 370, 371, 385.5

(56) References Cited

U.S. PATENT DOCUMENTS 3,758,649 A    9/1973  Frattarola (List continued on next page.)

FOREIGN PATENT DOCUMENTS

EP    1 213 319 A2    6/2002

(List continued on next page.)

OTHER PUBLICATIONS

Schimtz, Peter et al., "Films." Ullmann's Encyclopedia of Industrial Chemistry, 5th Ed., vol. A11 (1988), pp. 85–95, 108–110.*

(List continued on next page.)

Primary Examiner—Vivian Chen
(74) Attorney, Agent, or Firm—Piper Rudnick LLP

(57) ABSTRACT

A directly embossable, coated polyethyleneterephthalate film including a dry, uniaxially oriented PET film, and a coating applied to the PET film, wherein the coating and the PET film have as a composite been transversely stretched, the film being coated from an aqueous solution at a thickness of about 0.1 μm–about 0.4 μm with a non-crosslinked polystyrene-acrylic emulsion and non-crosslinked polyester dispersion, the Tg of the coating resin being greater than about 20° C. and less than about 70° C., the coating resin being capable of impregnating the PET surface on drawing, rendering the film surface susceptible to embossing under pressure and the coating having low heat sealability and a method of producing a coated, directly embossable polyethyleneterephthalate film including uniaxially stretching a polyterephthalate film to form a uniaxially oriented polyethyleneterephthalate film, drying the uniaxially oriented polyethyleneterephthalate film, coating at least one surface of the uniaxially oriented polyethyleneterephthalate film with an aqueous solution of an organic material, drying the coating to form a coated uniaxially oriented polyethyleneterephthalate film, rendering at least one surface of the coated uniaxially oriented polyethyleneterephthalate film susceptible to direct embossing by impregnation of the surface of the uniaxially oriented polyethyleneterephthalate film with at least a portion of the coating by transverse stretching the coated, uniaxially oriented polyethyleneterephtlate film.

31 Claims, 1 Drawing Sheet

U.S. PATENT DOCUMENTS

| | | |
|---|---|---|
| 3,922,416 A | 11/1975 | Ryan |
| 4,585,687 A | 4/1986 | Posey et al. |
| 4,913,858 A | 4/1990 | Miekka et al. |
| 5,155,604 A | 10/1992 | Miekka et al. |
| 5,164,227 A | 11/1992 | Miekka et al. |
| 5,213,868 A * | 5/1993 | Liberty et al. ............... 428/131 |
| 5,464,690 A | 11/1995 | Boswell |
| 5,643,678 A | 7/1997 | Boswell |
| 5,670,240 A | 9/1997 | Davis |
| 5,670,254 A * | 9/1997 | Akhter ....................... 428/349 |
| 5,674,580 A | 10/1997 | Boswell |
| 5,756,183 A | 5/1998 | Kutsch et al. |
| 5,759,683 A | 6/1998 | Boswell |
| 5,888,599 A * | 3/1999 | Bradt ......................... 428/35.7 |
| 5,932,150 A | 8/1999 | Lacey |
| 6,238,788 B1 * | 5/2001 | Bradt ......................... 428/349 |
| 6,372,073 B1 * | 4/2002 | Weder ........................ 156/209 |
| 6,432,497 B2 * | 8/2002 | Bunyan ..................... 428/40.1 |
| 2003/0108756 A1 * | 6/2003 | Fitche et al. ................ 428/480 |

FOREIGN PATENT DOCUMENTS

| | | | |
|---|---|---|---|
| GB | 1 078 813 A | | 8/1967 |
| KR | 2001-053913 | * | 7/2001 |

OTHER PUBLICATIONS

Bryson, Trudy, *Creating Interference Colors on Thermoplastic Films Without Colorants,* Coburn Corporation, Oct. 6, 1982.

Mann, S.F., *Holographic Advances Open New Dimensions for Converters,* Dennison Mfg. Co., Jul. 1986.

*Optical Embossing,* James River Products, Jun. 14, 2001.

* cited by examiner

COATED FILM WITH EXCEPTIONAL EMBOSSING CHARACTERISTICS AND METHOD FOR PRODUCING IT This application claims benefit of U.S. Provisional Application Ser. No. 60/348,422 filed Oct. 24, 2001 and Ser. No. 60/317,765 filed Sep. 6, 2001.

BACKGROUND

Holograms and diffraction gratings are images that diffract light created by the texturizing of a substrate under heat and pressure. Such images are used to create decorative packaging, security products and a host of other uses. The embossed substrates are often metallized to create high contrast. Such metallized substrates are found on credit cards, membership materials, board laminates such as packaging materials, labels, toys and many commodity products.

Currently, it is well known in the art to produce holograms by embossing polyvinylchloride (PVC), polyethyleneterephthalate (PET), biaxially oriented polypropylene (BOPP), polystyrene (PS), polyamides (PA) such as Nylon or other plastic materials. If the substrates are BOPP or PET, it is also well known in the art to produce holographic substrates by coating a relatively thick acrylic layer on the substrate by a coating process. In the case of PET substrates, the coating is applied in an off-line process as is often done by hologram manufacturers at the point of use of the web substrate. However, it is desirable to obtain a pre-coated and embossable PET film from a substrate manufacturer that can directly accept the holographic texture. Such a material would obviate the need for the hologram manufacturers to coat the base materials and reduce overall costs of manufacturing.

Unfortunately, in order to produce a directly embossed film at the point of film manufacture, it has been necessary to provide a thick, embossable surface on the PET film. Such a surface can be provided either through a co-extrusion process or, perhaps, through an inline coating process. In the case of co-extrusion, it is necessary to produce a surface layer with many of the same characteristics of PET. Therefore, IV, melt strength and the like are necessary to get the co-extruded layer through the PET film making process. Typical materials that can survive this process are often analogs of PET itself. These materials suffer the problem of having low crystallinity and are, therefore, heat-sealable. A heat-sealable material will often stick to the embossing shim rendering the embossed texture of little commercial quality.

In the case of inline coating of PET film, the thickness deemed necessary to produce embossable holographic substrates is practically impossible to achieve with a film making process. A thick-coated layer will require reduced PET film making line speeds to accommodate the high water loads in a tenter oven. In addition, the presence of a thick coating on the PET film often makes recycling of coated PET film waste back into the process difficult, or in many cases impossible.

DESCRIPTION OF THE PRIOR ART

U.S. Pat. No. 4,913,858 describes the requirements of an offline coating for holographic embossing use.

U.S. Pat. No. 3,758,649 describes embossing directly into a thermoplastic sheet.

Other known publications include:

"Creating Interference Colors on Thermoplastic Films Without Colorants", Trudy Bryson, Coburn Corporation, 1982

"Dimension, design and printability", James Coburn

"Holographic Advances Open New Dimensions for Converters", S. F. Mann, Dennison Mfg. Co., 1986

"Optical Embossing", James River Products

SUMMARY OF THE INVENTION

This invention relates to a composite polyethyleneterephtlate film adapted as a directly embossable substrate for holographic use, wherein the film is produced by inline coating uniaxially oriented PET film, drying and then transverse stretching the coating and film to produce the composite film.

The invention also relates to a directly embossable, coated polyethyleneterephthalate film including a dry, uniaxially oriented PET film, and a coating applied to the PET film, wherein the coating and the PET film have as a composite been transversely stretched, the film being coated from an aqueous solution with a non-crosslinked polystyrene-acrylic emulsion or a non-crosslinked polyester dispersion or a mixture thereof, the Tg of the coating resin being greater than about 20° C., preferably greater than about 35° C., and less than about 70° C., the coating resin being capable of impregnating a surface of the PET film on drawing, rendering the film surface susceptible to embossing under pressure and the coating having low heat sealability.

The invention further relates to a method of producing a coated, directly embossable polyethyleneterephthalate film including stretching a polyterephthalate film to form a uniaxially-oriented polyethyleneterephthalate film, drying the uniaxially oriented polyethyleneterephthalate film, coating at least one surface of the uniaxially oriented polyethyleneterephthalate film with an aqueous solution of an organic material, drying the coating to form a coated uniaxially oriented polyethyleneterephthalate film, rendering at least one surface of the coated uniaxially oriented polyethyleneterephthalate film susceptible to direct embossing by impregnation of the surface of the uniaxially oriented polyethyleneterephthalate film with at least a portion of the coating by transverse stretching the coated, uniaxially oriented polyethyleneterephthalate film.

In yet another aspect, the invention relates to a method of producing a directly embossable substrate having low heat sealability comprising inline coating a uniaxially oriented PET film with about 0.1 μm to about 0.2 μm in thickness of a non-crosslinked polystyrene-acrylic emulsion or non-crosslinked polyester dispersion, drying the coating, and transverse stretching the resulting coated film.

DETAILED DESCRIPTION OF THE INVENTION

Figure 1:
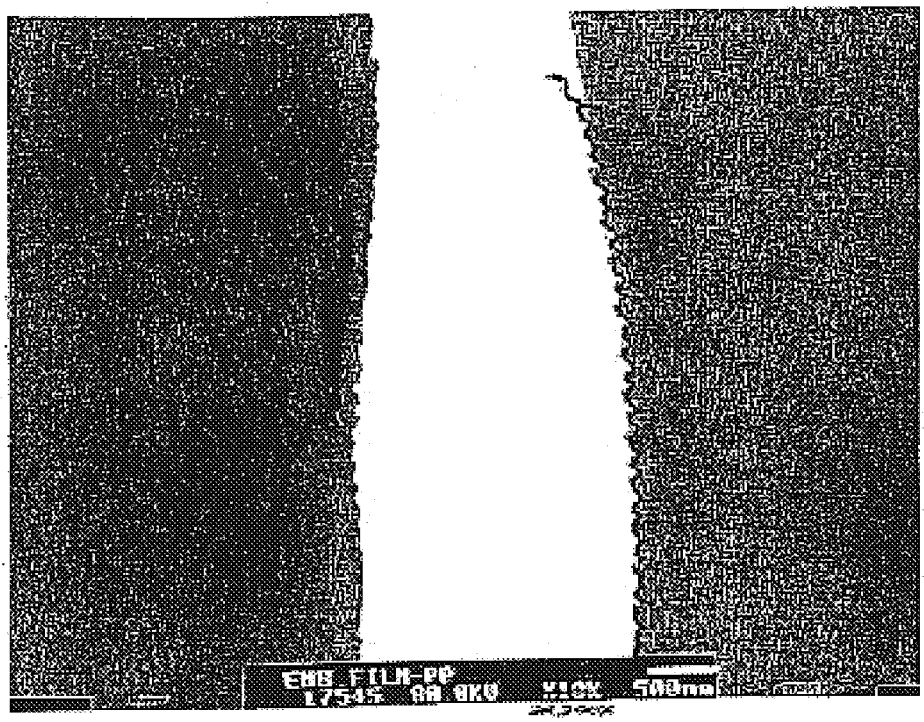
FIG. 1 is a TEM micrograph of an embossed pattern on coated PET film from Example 2.

We have discovered a method to render the PET embossable via the incorporation of a unique surface coating. This coating can be applied to PET film during the film making process and renders the PET film itself embossable by impregnating the PET and softening the upper layer of the film structure. The composite structure is then embossable without the need for a secondary coating step. Furthermore, this material maintains its embossability without acting as a heat-seal material. Such properties are required for low cost production of holographic images.

The film is produced by inline coating uniaxially oriented PET film, drying and then transverse stretching the coating to produce a composite structure of PET and coating, wherein the film is coated with an aqueous solution at a thickness of about 0.1 μm–about 0.4 μm with a non-crosslinked polystyrene-acrylic emulsion or non-crosslinked polyester dispersion, the coating resin having a Tg greater than about 20° C., the coating resin being capable of impregnating the PET surface on drawing, thereby rendering the film surface susceptible to embossing under pressure such that the coating has a low heat sealability.

The polyethyleneterephtlate film may also preferably have a Tg greater than about 35° C. but less than about 70° C. The PET film preferably has a thickness of about 4.5 μm to about 60 μm and preferably contains particles. The particles are preferably selected from the group consisting of silica, alumina, calcium carbonate and mixtures thereof, although other types of particles are possible. The particles are also preferably present in the amount of about 0.05 wt % to about 0.6 wt %, based on the weight of the PET film. The PET film may be a 3 layered structure.

The non-oriented PET film is preferably stretched in an amount of about 3.4 to about 5.4 times. Also, the coated PET film is preferably stretched in an amount of about 3.3 to about 4.6 times in the transverse direction.

The coating is most preferably formed from a material selected from the group selected from a non-crosslinked polystyrene-acrylic emulsion and non-crosslinked polyester dispersion. The coating should have a thickness of about 0.1 μm to about 0.4 μm. Also, the coating may contain a fluorosurfactant. Finally, the coating may have a Tg greater than about 35° C. and less than about 70° C.

The method also includes producing a directly embossable substrate having low heat sealability, including inline coating a uniaxially oriented PET film with about 0.1 μm to about 0.4 μm in thickness of a non-crosslinked polystyrene-acrylic emulsion or non-crosslinked polyester dispersion, drying the coating and transverse stretching the resulting coated film, wherein transverse stretching causes the coating to impregnate surface portions of the PET film.

We have discovered that it is also advantageous to employ an adhesion promoter to obtain further enhanced adhesion between the PET film and the coating. One particularly advantageous type of adhesion promoter is a polyfunctional aziridine, preferably "Xama 7" sold by Sybron, Inc. Of course, other adhesion promoters may be utilized in accordance with the invention.

The invention will be further described hereinafter with reference to Examples which are intended as being illustrative of the invention and in no way are to be construed as limiting in any way.

At the outset, a thermoplastic polyester film was prepared as follows: Polyethylene terephthalate was polymerized by a known method: A melt slurry of ethylene glycol and purified terephthalic acid was heated, in the presence of a esterification catalyst, and water and excess ethylene glycol were removed under vacuum, leaving a residual melt of polyester. This melt was discharged via strand die into a cooling trough, pelletized, and then further dried to remove residual moisture to less than 50 ppm. Trimethylphosphate of 0.032 wt %, magnesium acetate of 0.060 wt %, antimony trioxide of 0.026 wt %, and tetraethyl ammonium hydroxide of 0.252 wt %, was also used to prepare polyester A. External particles were not added to polyester A.

Polyethylene terephthalate was polymerized by a known method: A melt slurry of ethylene glycol and purified terephthalic acid was heated, in the presence of a esterification catalyst, and water and excess ethylene glycol were removed under vacuum, leaving a residual melt of polyester. This melt was discharged via strand die into a cooling trough, pelletized, and then further dried to remove residual moisture to less than 50 ppm. Lithium acetate dihydrate of 0.226%, trimethylphosphate of 0.181 wt %, phosphorous acid of 0.020 wt %, antimony trioxide of 0.04 wt %, and calcium acetate of 0.119 wt %, was also used to prepare polyester B.

Particles (A) being $SiO_2$ particles of an average particle size 2.6 μm, were admixed into polyethylene terephthalate polymerized by a known method: A melt slurry of ethylene glycol and purified terephthalic acid was heated, in the presence of a esterification catalyst, and water and excess ethylene glycol were removed under vacuum leaving a residual melt of polyester. This melt was discharged via strand die into a cooling trough, pelletized, and then further dried to remove residual moisture to less than 50 ppm. Tetraethyl ammonium hydroxide of 0.049 wt %, lithium acetate dihydrate of 0.882 wt %, antimony trioxide of 0.039 wt %, calcium acetate of 0.090 wt %, and trimethylphosphate of 0.042 wt % was also used to prepare polyester C. The content of particles (A) in the polyester pellet (C) was 2.0%.

Next, 48.5 parts by weight of pellets (A), 48.5 parts by weight of pellets (B), and 3.0 parts by weight of pellets (C) were mixed. Up to 55% recycle consisting of finished film can replace equal parts of polymer A and polymer B. The mixed pellets were dried under vacuum at 150° C. for 3 hours and supplied to an extruder and melted, mixed and then extruded at a temperature of 285° C. The extruded polymer was delivered through a die in the form of a molten curtain producing a mono-layer structure. The resulting melt curtain was quenched on a casting drum, and then biaxially oriented via subsequent stretching steps on a roller train and chain driven transverse stretcher as is well known in the art. The total thickness of the film ranged from 4.5 μm to 60 μm.

Also, 48.5 parts by weight of pellets (A), 48.5 parts by weight of pellets (B), and 3.0 parts by weight of pellets (C) were mixed. The mixed pellets were extruded using a vent type two-screw extruder to produce melt stream (I). Next, 48.5 parts by weight of pellets (A), 48.5 parts by weight of pellets (B), and 3.0 parts by weight of pellets (C) were mixed. Up to 55% recycle consisting of finished film can replace equal parts of polymer A and polymer B. The mixed pellets were dried under vacuum at 150° C. for 3 hours and extruded to produce melt stream (II). Melt stream (I) was fed through a rectangular joining zone where it was laminated to a melt stream of polyester (II). The laminate produced a three layer co-extruded I/II/I structure where polymer (I) and polymer (II) were essentially the same. The extruded polymer was delivered through a die in the form of a molten curtain. The resulting melt curtain was quenched on a casting drum, and then biaxially oriented via subsequent stretching steps on a roller train and chain driven transverse stretcher as is well known in the art. The total thickness of the film ranged from about 4.5 μm to about 60 μm.

During the film making process, the uniaxially oriented PET film is then dried and stretched in the transverse direction. Such a process is well known in the art. However, we have determined that certain coatings impregnate the upper surface of the polyester film during the transverse stretching operation. This then renders the upper polyester surface modified. We have determined certain coatings that render the upper surface of the polyester film pliable, but not heat sealable, such that this modification to the polyester film renders the composite film structure capable of being embossed under heat and pressure. This makes the composite PET film processable for holographic film use without the need for a secondary coating step.

The embossing evaluation of the coated films were performed as follows: A 12 ton Carver hydraulic hot press model #3912 with 6×6 inch heated platens was used to evaluate the embossing capabilities of the coated film material. A 4×4 inch nickel embossing shim was placed on top of a 4×4 inch sample of PET film. Both platens were heated to 220° F. The film sample and shim was pressed together for 10 seconds at 400 psi. The sample was removed and allowed to cool. After cooling, the embossed PET film was slowly peeled off the shim at about a 45 degree angle. In order to visually determine the quality of the embossing, the PET film sample was placed on a black background to enhance the visibility of the embossed image.

Qualitatively, the embossing of the PET film was rated as follows:

Excellent=Bright colors viewed from many angles.

Good=Colors not as robust from viewed at different angles.

Poor=Colors dull or incomplete embossing noted.

When removing the embossed PET from the shim as described in some instances the PET film heat sealed to the shim. In these cases, the image received was poor due to transfer of the coating to the shim. For these cases a rating of good heat sealability was noted.

The following Examples are illustrative of the invention.

EXAMPLES

Example 1

| Coating solution #1 | |
| --- | --- |
| Amorphous Sulphopolyester dispersion (1) | 6 parts |
| Fluorosurfactant (2) | 0.001 Parts |
| Deionized Water | 94 Parts |

(1) Eastek 1000 sold by Lawter, Incorporated
(2) Zoynl FSO sold by DuPont, Inc.

A coating solution #1 was coated onto uniaxially oriented PET utilizing a #5 wire wound bar. This coating was dried and then the PET film was drawn in the transverse direction to a stretching ratio of about 3.8 to produce a composite PET film with a surface coating thickness of about 0.12 μm. This film was determined to be readily embossable. Furthermore, the coating was not heat sealable to the shim.

Comparative Example 1

The coating solution #1 was coated onto uniaxially oriented PET utilizing a #3 wire wound bar. This coating was dried and then the PET film drawn in the transverse direction to a stretching ratio of about 3.8 to produce a composite PET film with a surface coating thickness of about 0.05 μm. This film was difficult to emboss and produced a poor image.

Example 2

| Coating solution #2 | |
| --- | --- |
| Styrene-acrylic emulsion (3) | 10 Parts |
| Fluorosurfactant | 0.01 Parts |
| Deionized Water | 90 Parts |

(3) Paracryl 8227 sold by Parachem, Incorporated.

The coating solution #2 was coated onto uniaxially oriented PET utilizing a #3 wire wound bar. This coating was dried and then the PET film was drawn in the transverse direction to produce a composite PET film with a surface coating thickness of about 0.10 μm. This coated PET film was then drawn in the transverse direction. Very good embossing was received under the test conditions.

Example 3

| Coating solution #3 | |
| --- | --- |
| Styrene-acrylic emulsion (4) | 6 Parts |
| Fluorosurfactant | 0.01 Parts |
| Deionized Water | 94 Parts |

(4) Setalux 37-3372 sold by Akzo Nobel, Incorporated.

The coating solution #3 was coated onto uniaxially oriented PET utilizing a #3 wire wound bar. This coating was dried and then the PET film was drawn in the transverse direction to produce a composite PET film with a surface coating thickness of about 0.10 μm. This coated PET film was then drawn in the transverse direction. Very good embossing was received under the test conditions.

Comparative Example 2

| | |
| --- | --- |
| Styrene-acrylic emulsion (5) | 10 Parts |
| Fluorosurfactant | 0.01 Parts |
| Deionized Water | 90 Parts |

(5) Paracryl 8340 sold by Parachem, Incorporated.

This coating solution, polystyrene, methylmethacrylate emulsion with a Tg of 16 C, was coated onto uniaxially oriented PET. This coated film was then drawn in the transverse direction. Poor embossability was received under the test conditions used.

Comparative Example 3

| | |
| --- | --- |
| Styrene-acrylic emulsion (6) | 10 Parts |
| Fluorosurfactant | 0.01 Parts |
| Deionized Water | 90 Parts |

(6) Hycar 26288 sold by BF Goodrich Company.

This coating solution, a Styrene Acrylic emulsion with a Tg of 20 C was coated onto uniaxially oriented PET. This coated PET film was then drawn in the transverse direction. The embossing was fair under the embossing test conditions.

Example 4

Coating solution #2 was coated onto 2 mil biaxially oriented PET, utilizing a #4 rod and dried in a force hot air oven. The embossing process rendered an excellent image with this thicker coating.

Example 5

| Coating solution #5 | |
| --- | --- |
| Styrene-acrylic emulsion (4) | 48 parts |
| Polyester dispersion (7) | 14 parts |
| Deionized Water | 38 parts |

(4) Setalux 33-3372, Sold by Akzo Nobel, Incorporated
(7) Evcote P60-30, Sold by Evco, Inc.

Coating solution #5 was coated onto uniaxially oriented PET utilizing a #4 wire wound bar. This coating was dried and then the PET film was drawn in the transverse direction to produce a composite PET film with a surface coating thickness of about 0.40 μm. This coated PET film was then drawn in the transverse direction. Very good embossing was received under the test conditions.

Example 6

| Coating solution #6 | |
|---|---|
| Styrene-acrylic emulsion (4) | 48 parts |
| Polyester Dispersion (7) | 14 parts |
| Deionized Water | 38 parts |
| Polyfunctional Aziridine (8) | 0.2 parts |

(4) Setalux 33-3372, Sold by Akzo Nobel, Incorporated.
(7) Evcote P60-30, Sold by Evco, Inc.
(8) Xama 7, Sold by Sybron, Inc.

Coating solution #6 was coated onto uniaxially oriented PET utilizing a #4 wire wound bar. This coating was dried and then the PET film was drawn in the transverse direction to produce a composite PET film with a surface coating thickness of about 0.4 μm. This coated PET film was then drawn in the transverse direction. Very good embossing was received under the test conditions.

Comparative Example 4

Comparative example #2 coating solution was coated onto 2 mil biaxially oriented PET, utilizing a #4 rod and dried in a force hot air oven. The resulting film was subjected to embossing conditions as described here. However, the adhesion to the base film was very poor and the coated film degraded significantly during the embossing process rendering no useable image.

Comparative Example 5

| Coating solution #4 | |
|---|---|
| Highly branched PEG-PET Dispersion (5) | 5 Parts |
| Fluorosurfactant (2) | 0.001 Parts |
| Deionized Water | 94 Parts |

(5) EvCo P56 sold by Evco, Incorporated.

Coating solution #4 was coated onto 2 mil biaxially oriented PET, utilizing a #4 rod and dried in a force hot air oven at 150° C. for about 30 seconds. The resultant film was subjected to embossing conditions as described here. However, the coating adhered to the embossing shim giving poor release. In order to separate the embossed film from the shim force was required. This resulted in the film tearing and the coating, in places, separating from the shim. The resulting image was unusable.

Comparative Example 6

| Coating solution #6 | |
|---|---|
| Styrene-acrylic emulsion (9) | 10 Parts |
| Fluorosurfactant | 0.01 Parts |
| Deionized Water | 90 Parts |

(7) Setalux 6769 sold by Akzo Nobel.

This coating solution, a styrene, methylmethacrylate emulsion with a Tg of 40 C was coated onto uniaxially oriented PET. This coated PET film dried and then the film was drawn in the transverse direction. The embossing was poor under the embossing test conditions.

| Example # | Tg | Coating Thickness | Heat Sealability | Embossing Result |
|---|---|---|---|---|
| 1 | 50 | 0.15 μm | Poor | Excellent |
| 2 | 43 | 0.10 μm | Poor | Good |
| 3 | 54 | 0.10 μm | Poor | Excellent |
| 4 | 43 | 0.15 μm | Poor | Excellent |
| 5 | 52 | 0.4 μm | Poor | Excellent |
| 6 | 52 | 0.4 μm | Poor | Excellent |
| Comparative 1 | 50 | 0.05 μm | Poor | Poor |
| Comparative 2 | 16 | 0.10 μm | Poor | Fair |
| Comparative 3 | 20 | 0.10 μm | Poor | Poor |
| Comparative 4 | 16 | 0.15 μm | Poor | Poor |
| Comparative 5 | 65 | 0.10 μm | Good | Excellent |
| Comparative 6 | 40 | 0.10 μm | Poor | Poor |

The upper PET surface is clearly embossed in Example 2 and as shown in FIG. 1. As is readily apparent, the uncoated surface is also embossed.

In order to function as an embossable coated PET, it is necessary for the surface coating to be pliable. However, this pliability should not be such that the coating readily adheres to shims typically used to emboss PET films. Furthermore, it is necessary that the surface coating sufficiently impregnate the upper PET surface to soften the upper layer of the PET to render a bright image upon embossing. Therefore, our discovery of specific chemistry types that impregnate the upper PET surface and render the composite layer embossable without acting as a heat-seal layer to a holographic shim, represent a unique and valuable discovery.

What is claimed is:

1. A directly embossable, coated polyethyleneterephthalate (PET) film comprising:
    a dry, uniaxially oriented PET film; and
    a coating applied to the PET film,
    wherein the coating and the PET film have as a composite been transversely stretched, said film being coated with a non-crosslinked polystyrene-acrylic emulsion or a mixture of non-crosslinked polyester dispersion, the Tg of said coating resin being greater than about 20° C. and less than about 70° C., said coating resin being capable of impregnating a surface of the PET film on drawing, thereby rendering a surface of the film susceptible to embossing under pressure.

2. The film of claim 1, wherein the PET film is a three layer structure.

3. The polyethyleneterephtlate film defined in claim 2, wherein the Tg is greater than about 35° C.

4. The polyethyleneterephtlate film defined in claim 2, wherein the Tg is less than about 70° C.

5. The film of claim 1, wherein the PET film has a thickness of about 4.5 μm to about 60 μm.

6. The film of claim 1, wherein the PET film contains particles.

7. The film of claim 6, wherein the particles are selected from the group consisting of silica, alumina, calcium carbonate and mixtures thereof.

8. The film of claim 6, wherein the particles are present in the amount of about 0.005 wt % to about 0.6 wt %, based on the weight of the PET film.

9. The film of claim 1, wherein a non-oriented PET film is stretched in an amount of about 3.4 to about 5.4 times.

10. The film of claim 1, wherein the coated PET film is stretched in an amount of about 3.3 to about 4.6 times in the transverse direction.

11. The film of claim 1, wherein the coating has a thickness of about 0.1 µm to about 0.4 µm.

12. The film of claim 1, wherein the coating contains a fluorosurfactant.

13. The film of claim 1, wherein the coating has a Tg greater than about 35° C. and less than about 70° C.

14. The film of claim 1, wherein the coating further comprises an adhesion promoter.

15. The film of claim 14, wherein the adhesion promoter is a polyfunctional aziridine.

16. The film defined in claim 1, wherein the PET film is coated at a thickness of about 0.1 µm–about 0.4 µm.

17. A method of producing a coated, directly embossable polyethyleneterephthalate (PET) film comprising:

stretching a PET film to form a uniaxially oriented PET film;

drying the uniaxially oriented PET film;

coating at least one surface of the uniaxially oriented PET film with an aqueous solution of an organic material; and rendering at least one surface of a resulting coated uniaxially oriented PET film susceptible to direct embossing by impregnation of the surface of the uniaxially oriented PET film with at least a portion of the coating by transverse stretching the coated uniaxially oriented PET film.

18. The method of claim 17, wherein the PET film is a three layer structure.

19. The method of claim 17, wherein the PET film has a thickness of about 4.5 µm to about 60 µm.

20. The method of claim 17, wherein the PET film contains particles.

21. The method of claim 20, wherein the particles are selected from the group consisting of silica, alumina, calcium carbonate and mixtures thereof.

22. The method of claim 20, wherein the particles are present in the amount of about 0.005 wt % to about 0.6 wt %, based on the weight of the PET film.

23. The method of claim 17, wherein the PET film is stretched in an amount of about 3.4 to about 5.4 times.

24. The directly embossable, coated polyethyleneterephthalate film of claim 17, wherein the coated PET film is stretched in an amount of about 3.3 to about 4.6 times in the transverse direction.

25. The method of claim 17, wherein the coating is formed from a material selected from the group consisting of a non-crosslinked polystyrene-acrylic emulsion and non-crosslinked polyester dispersion.

26. The method of claim 17, wherein the coating has a thickness of about 0.1 µm to about 0.4 µm.

27. The method of claim 17, wherein the coating contains a fluorosurfactant.

28. The method of claim 17, wherein the coating has a Tg greater than about 20° C. and less than about 70° C.

29. The method of claim 17, further comprising embossing selected surface portions of the PET film under pressure.

30. The method of claim 17, wherein the coating further comprises an adhesion promoter.

31. The method of claim 30, wherein the adhesion promoter is a polyfunctional aziridine.

* * * * *

UNITED STATES PATENT AND TRADEMARK OFFICE
CERTIFICATE OF CORRECTION

PATENT NO. : 6,737,170 B2 Page 1 of 1
APPLICATION NO. : 10/087689
DATED : May 18, 2004
INVENTOR(S) : John Fitch et al.

It is certified that error appears in the above-identified patent and that said Letters Patent is hereby corrected as shown below:

Column 8, line 15, delete "Fair" and insert --Poor--.

Column 8, line 16, delete the second "Poor" and insert --Fair--.

Column 8, line 18, delete "Excellent" and insert --Poor--.

Signed and Sealed this

First Day of April, 2008

JON W. DUDAS
*Director of the United States Patent and Trademark Office*